US 8,325,586 B2

(12) United States Patent
Mijiritskii

(10) Patent No.: US 8,325,586 B2
(45) Date of Patent: Dec. 4, 2012

(54) REWRITABLE OPTICAL RECORD CARRIER

(75) Inventor: Andrei Mijiritskii, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1187 days.

(21) Appl. No.: 10/538,333

(22) PCT Filed: Dec. 3, 2003

(86) PCT No.: PCT/IB03/50032
§ 371 (c)(1),
(2), (4) Date: Jun. 10, 2005

(87) PCT Pub. No.: WO2004/051632
PCT Pub. Date: Jun. 17, 2004

(65) Prior Publication Data
US 2006/0109577 A1    May 25, 2006

(30) Foreign Application Priority Data

Dec. 13, 2002  (EP) ................................. 02080275
Feb. 13, 2003  (EP) ................................. 03100329

(51) Int. Cl.
*G11B 7/24*    (2006.01)
(52) U.S. Cl. .............. 369/275.1; 369/275.2; 430/270.13
(58) Field of Classification Search ............... None
See application file for complete search history.

(56) References Cited

U.S. PATENT DOCUMENTS

| 4,216,501 | A | * | 8/1980 | Bell | 369/275.1 |
| 5,214,636 | A | * | 5/1993 | Ishikawa et al. | 369/286 |
| 5,439,752 | A | * | 8/1995 | Yoshioka et al. | 428/623 |
| 5,620,792 | A | * | 4/1997 | Challener, IV | 428/332 |
| 6,251,492 | B1 | * | 6/2001 | Tomie | 428/64.1 |
| 6,551,681 | B2 | * | 4/2003 | Abiko et al. | 428/64.1 |
| 2002/0192424 | A1 | | 12/2002 | Ohkubo | |
| 2003/0031823 | A1 | | 2/2003 | Ito et al. | |
| 2004/0062189 | A1 | * | 4/2004 | Matsukawa et al. | 369/275.4 |
| 2005/0202204 | A1 | * | 9/2005 | Nishihara et al. | 428/64.4 |

FOREIGN PATENT DOCUMENTS

| EP | 0949613 A | 10/1999 |
| JP | 62177735 A | 8/1987 |
| JP | 3088144 A | 4/1991 |
| JP | 4113529 A | 4/1992 |
| JP | 04195831 A * | 7/1992 |
| JP | 10162433 A | 6/1998 |
| JP | 2000322740 A | 11/2000 |
| JP | 2002269825 A | 9/2002 |
| JP | 2002312978 A | 10/2002 |
| JP | 2002329348 A | 11/2002 |
| WO | WO0063899 A | 10/2000 |
| WO | 02059890 A1 | 8/2002 |

* cited by examiner

*Primary Examiner* — Tan X Dinh

(57) ABSTRACT

The invention relates to a rewritable optical record carrier (100) comprising a recording stack (110) of layer (114), a recording layer comprising a phase-change recording material, and a second dielectric layer (116), having a thermal barrier layer (122) arranged adjacent to said first dielectric layer.

13 Claims, 2 Drawing Sheets

REWRITABLE OPTICAL RECORD CARRIER

The present invention relates to a rewritable optical record carrier comprising a recording stack of layers with a first dielectric layer ($I_1$), a recording layer comprising a phase-change recording material (PC), and a second dielectric layer ($I_2$).

Throughout all known rewritable optical recording media such as CD-RW, DVD-RAM, DVD-RW, DVD+RW, and Blu-ray Disc (BD) a recording stack is applied comprising such a phase-change recording stack. The PC layer commonly is sandwiched in a stack between two dielectric $ZnS$—$SiO_2$ layers. Presently, the medium of choice for erasable phase-change recording is an alloy with a durable polycrystalline structure, e.g. an alloy composed of Sb and Te in additions of In, Ge, and/or Ag. On one side ($I_2$-side) of such a recording stack a mirror layer is disposed which is typically made of metal such as gold, silver or aluminum. In case of a CD/DVD the recording stack is disposed with its other side ($I_1$-side) on a substrate such as a polycarbonate substrate for example and a cover layer is attached on the opposite side to the mirror layer. A writing laser beam modulated according to a recording signal enters the recording medium from the substrate side ($I_1$-side first). In case of a BD the recording stack is disposed with its mirror layer side ($I_2$-side) on a substrate and a cover layer is attached to the recording stack opposite to the mirror layer ($I_1$-side). The writing laser beam then enters the recording medium from this side ($I_1$-side first).

In both cases the beam is focused on the recording stack. While the disc is moved with respect to the focused laser beam the latter is principally absorbed by the recording layer. Thereby, the alloy is locally heated. When the temperature exceeds its melting point (about 500° C. to 700° C.) for a certain period of time the phase change material converts to an amorphous state. A rapid heat dissipation through the adjacent dielectric layers causes a fast cooling of the alloy, thereby stabilising the amorphous phase. Thus, written marks remain along the track. Applying a laser beam with a reduced power allows to erase written marks. Thereby, the recording layer is heated to a temperature of about 200° C. inducing a phase change back to the crystalline phase. Since the atoms must be kept at elevated temperatures long enough to recrystallize, crystallization is a rather slow process although amorphization in PC media can be very rapid.

Normally, the stack has a high-to-low signal polarity, i.e. it has high reflectivity in the crystalline phase (ground state) whereas the reflectivity is reduced in the amorphous phase (written state). Therefore, a reading beam focused on said recording stack is reflected at the stack with different intensity depending on whether it strikes a written amorphous mark (pit) or an unwritten crystalline area (land).

Thus, the dielectric layers and the reflective layer perform several tasks: protecting the recording layer against mechanical damage, creating an optically tuned structure that has optimized reflectivity and/or absorptivity (optical performance), allowing the tailoring of the thermal properties of the disk for rapid cooling and best protection against thermal damage.

As can be seen in FIG. 3, the optical performance periodically depends on the first dielectric layer thickness $d_1$. In particular, the amorphous and the crystalline reflection has minimum and maximum levels at certain $d_1$ values. The periodicity can be denoted as follows $$d_1 = (m^*\lambda)/(2^*n) \quad (1)$$

wherein m is an integer, $\lambda$ denotes the wavelength of the laser light, and n is the refractive index of the $I_1$ layer material. The optical contrast which is the difference between the crystalline and the amorphous reflection normalized by the crystalline reflection, consequently, varies with the same periodicity.

The PC layer shows different indices of refraction in its crystalline state and its amorphous state. Therefore, the index of refraction mismatch between the PC layer and the adjacent dielectric layers—being responsible for the reflectivity—cause a phase shift between the amorphous and the crystalline reflectivity. In case of a high-to-low signal polarity as shown in FIG. 3 the thickness $d_1$ of the $I_1$ layer is chosen best such that the amorphous reflection is close to its minimum. The intensity of the light reflected at a crystalline ground state area (land) in percent of the incident beam is indicated by squares. Triangles indicate the light reflected at an amorphous written state area (pit) in percent. Circles indicate the optical contrast between the crystalline and amorphous state in percent, whereby, the optical contrast represents the attenuation of the reflected light when the incident beam strikes a pit normalized by the crystalline state reflection. Consequently, the maximum optical contrast—and thus the best signal modulation—is obtained when the amorphous reflection is close to its minimum. Crosses indicate the optical phase shift between the crystalline and amorphous state. Thereby, according to FIG. 3, as a first approximation the optical performance does not depend on the order of the optical contrast maximum. Insofar, m is an arbitrary parameter.

However, the laser beam generated by a writing apparatus provided with a conventional optical writing head is focused having a short focal length. The angle of incidence of the light beam varies at the point of incidence across its width, see FIG. 4. In FIG. 4 401 denotes a laser beam before focusing, 402 is a focusing lens, 403 is a converging laser beam after focusing, 404 is the center line of the laser beam (401, 403) perpendicular to the surface 405 of a recording stack 406, 407 is the angle of incidence ($\alpha$), and more precisely, the angle between a ray in the focused beam and the normal incidence. For example the average angle $\alpha$ of a converging laser beam of a BD system is about 35°.

By this means the effective light-path $l_{eff}$ through the dielectric layer varies depending on the angle $\alpha$ according to $$l_{eff}(\alpha) = l_0/\cos(\alpha) \quad (2)$$

wherein $l_0$ denotes the light path normal to the surface. As can be seen from equation 2, the effective path length increases with angle $\alpha$ for the predetermined normal path length $l_0$. For example, if an angle of 35° is considered the increase of the effective path length amounts to 22%. The difference of the path lengths $$\Delta l = l_0^*(1/\cos(\alpha) - 1) \quad (3)$$

in turn causes phase shift and hence deterioration of the optical performance of the disc. That is to say, the thinner the dielectric layer the better the optical performance may be adjusted. Therefore, from the optical performance point of view the first dielectric layer thickness $d_1$ is to be chosen as thin as possible—or in the sense of reflection minima, $d_1$ is to be chosen at the first minimum (m=1).

While writable optical record carriers undergo an evolutionary increase in data capacity the numerical aperture of the objective lens increases and simultaneously the laser wavelength is reduced. For example, the total data capacity was increased from 650 MB (CD, NA=0.45, $\lambda$=780 nm) to 4.7 GB (DVD, NA=0.65, $\lambda$=670 nm) to finally 25 GB (BD, NA=0.85, $\lambda$=405 nm). In case of a BD-system the typical thickness of the first dielectric layer is only about 40 nm in order to obtain an acceptable optical performance. Eventually, for UV-recording with shorter wavelength the $I_1$ layer has to be even thinner.

But from the thermal protection point of view, the first dielectric layer which on the one hand protects the recording layer on the other hand protects the (polycarbonate) substrate (CD/DVD) or the cover layer (BD) from thermal damage. If it is chosen too thin, the heat produced while writing/erasing and reaching the substrate/cover can not be sufficiently reduced. The temperature obtained at the interface to the substrate/cover layer therefore could exceed the melting temperature of the substrate/cover layer material causing damage of the optical record carrier. This damage results in deterioration of the read signals and increase in noise and error rate. Therefore the first dielectric layer is to be chosen sufficiently thick. Or in the sense of reflection minima, $d_1$ is to be chosen at a minimum m>1. Thus, optimum thermal protection of the adjacent substrate (in case of a CD/DVD) or the adjacent cover layer (in case of a BD) and optimum optical performance are contradictory tasks.

Therefore, it is an object of the present invention to provide a rewritable optical record carrier with a stack design with good optical properties thereby providing sufficient thermal protection.

According to a first aspect of the present invention this object is achieved by rewritable optical record carriers as described in the opening paragraph which is characterized in that a thermal barrier layer is arranged adjacent to the first dielectric layer.

According to a second aspect which constitutes a further development of the first aspect of the invention the rewritable optical record carrier further comprises a substrate carrying said stack of layers having said thermal barrier layer arranged between said first dielectric layer and said substrate.

According to a third aspect which constitutes a further development of the second aspect of the invention the refraction index of said thermal barrier layer is close to the refraction index of said substrate.

According to a fourth aspect which constitutes a further development of the first aspect of the invention the record carrier further comprises a cover layer attached to said thermal barrier layer.

According to a fifth aspect which constitutes a further development of the fourth aspect of the invention the refraction index of said thermal barrier layer is close to the refraction index of said cover layer.

According to a sixth aspect which constitutes a further development of the second or third aspect of the invention said substrate material are polycarbonate or PMMA.

According to a seventh aspect which constitutes a further development of the fourth or fifth aspects of the invention said cover layer material is polycarbonate or transparent polymer resin.

According to an eighth aspect which constitutes a further development of anyone of the first to seventh aspects of the invention said thermal barrier layer material comprises $SiO_2$ or $Al_2O_3$ as its major component.

According to a ninth aspect which constitutes a further development of anyone of the first to eight aspects of the invention said first and second dielectric layer materials comprise one of the following components or a mixture thereof: $ZnS$, $SiO_2$, $Si_3N_4$, $Al_2O_3$ or $Ta_2O_5$.

According to a tenth aspect which constitutes a further development of anyone of the first to ninth aspects of the invention said phase-change recording material comprises a mixture of Ge, In, Sb, and Te.

The above an other objects, features and advantages of the present invention will become apparent from the following description of preferred embodiments thereof taken in conjunction with the accompanying drawings in which FIG. 1 shows a cross sectional view of a rewritable optical record carrier according to a first embodiment of the present invention;

Figure 1:
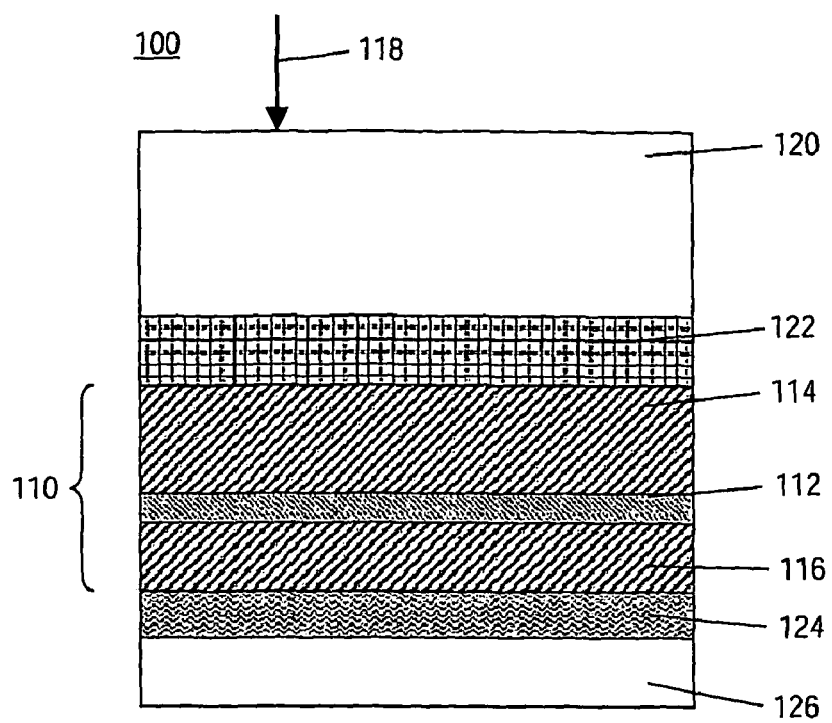

As can be seen in FIG. 1, the rewritable optical record carrier 100 according to a first embodiment of the present invention comprises a recording stack 110 consisting of a recording PC layer 112 sandwiched between a first dielectric $I_1$ layer 114 and a second dielectric $I_2$ layer 116. The dielectric layer material may comprise one of the following components or a combination thereof: $ZnS$, $SiO_2$, $Si_3N_4$, $Al_2O_3$ or $Ta_2O_5$, e.g. $(ZnS)_{80}(SiO_2)_{20}$. The PC layer may be composed of Sb and Te in additions of In, Ge, and/or Ag, e.g. GeInSbTe. On top of the record carrier 100, with regard to the direction of the incident light beam as indicated by arrow 118, one can find a substrate 120 typically made of polycarbonate or PMMA or the like. A thermal barrier layer 122 is deposited (illustrated upside down) onto the substrate. The recording stack 110 is laminated onto (illustrated below) the barrier layer in the order $I_1$-PC-$I_2$. Thus, the barrier layer being a good thermal insulator is arranged adjacent to the $I_1$ layer opposite the PC layer, thereby reducing the heat spread from the recording PC layer 112 across the $I_1$ layer 114 towards the substrate 120. A mirror layer 124 comprising aluminium, silver or gold or a mixture thereof, e.g. Al with some percentage of Ti, or gold, is deposited onto (illustrated below) the $I_2$ layer 116, thereby forming a MIPI-stack. The mirror layer 124 finally may be covered with a layer 126 made of polycarbonate or of transparent polymer resin/lacquer such as e.g. Sylgard 184 or the like in order to protect the mirror layer against mechanical damage. The arrangement according to FIG. 1 complies with the standard stack design of DVD- and CD-rewritable.

Figure 2:
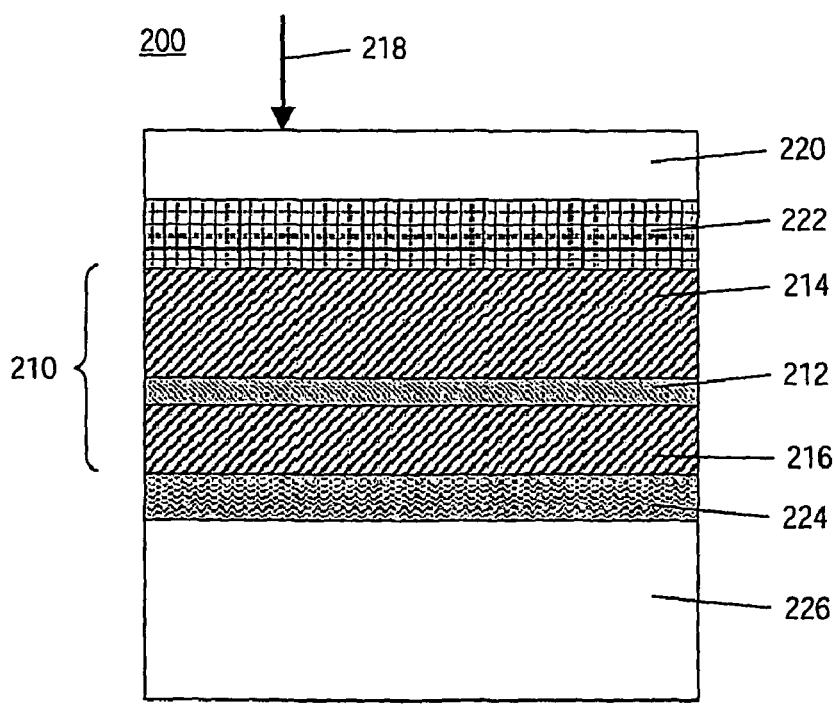
FIG. 2 shows a cross sectional view of a rewritable optical record carrier according to a second embodiment of the present invention.
Figure 3:
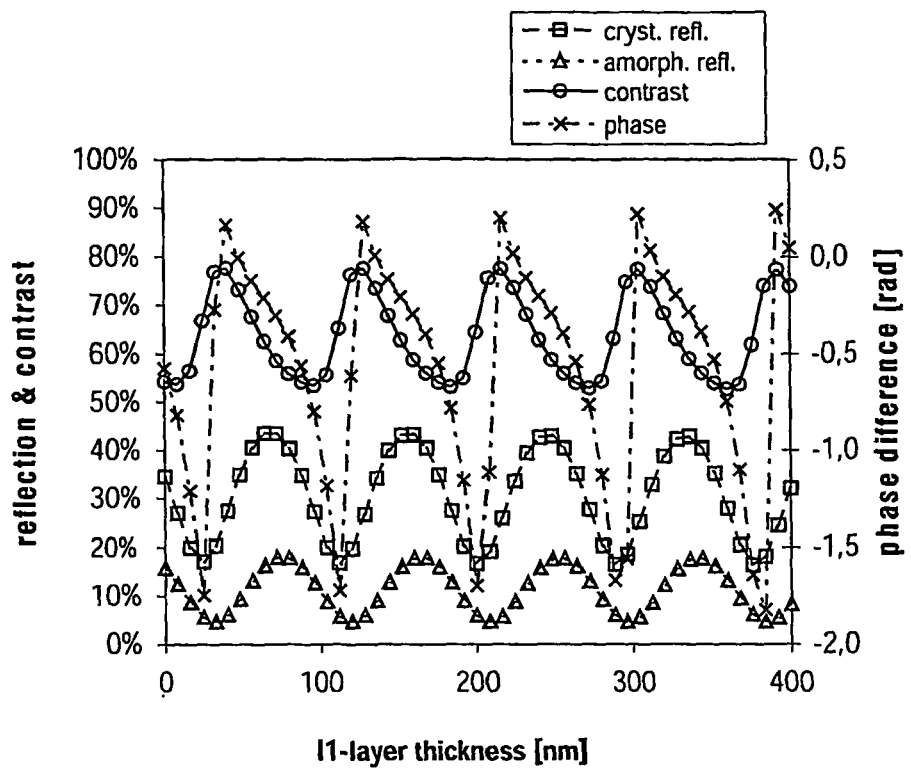
FIG. 3 shows the optical performance depending on the first dielectric layer thickness.
Figure 4:
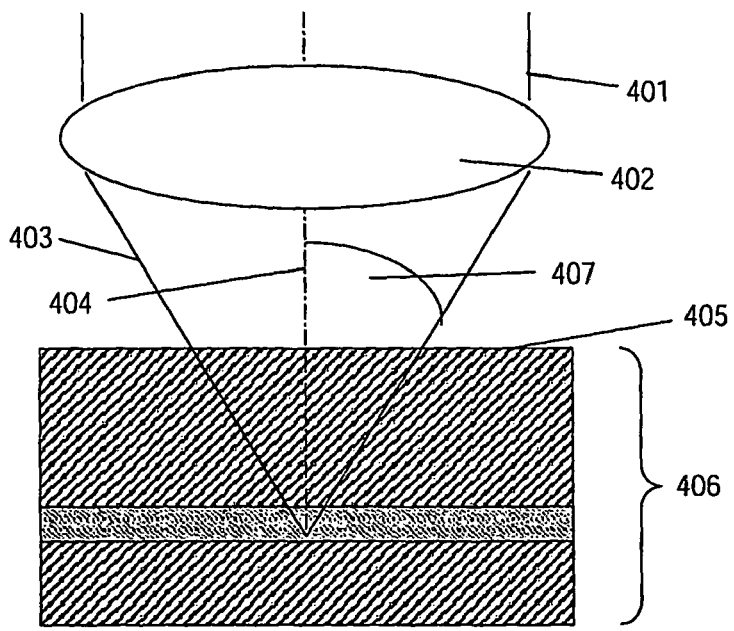
FIG. 4 illustrates the optical path of a converging laser beam.

The rewritable optical record carrier 200 according to a second embodiment of the present invention as shown in FIG. 2, typically complies with a BD stack design whereupon a mirror layer 224 is deposited onto a substrate 226 (bottom-up). A recording stack 210 is deposited onto the mirror layer in the order $I_2$-PC-$I_1$. A barrier layer 222 is attached to the $I_1$ layer 214 of the recording stack 210. Finally the barrier layer is covered with a cover layer 220. An incident light beam as indicated by arrow 218 in this case enters the stack on the cover layer side.

In both embodiments according to FIG. 1 and FIG. 2 the $I_1$-layer may comprise a multilayer structure, wherein the sublayer of the $I_1$-multilayer the most remote from the phase-change layer has its refractive index different from that of the substrate/cover.

The barrier layer material in both embodiments is to be chosen with a refraction index sufficiently close to that of the substrate/cover layer at a given wavelength of the writing/erasing laser beam. For example, when the cover layer material in the second embodiment is polycarbonate or Sylgard 184 and the wavelength of the laser beam is 405 nm, as given in the BD-system, the refractive index of the cover layer material is 1.5. An appropriate material for the barrier layer 122 then could be $SiO_2$ which has a refractive index of 1.5 at 405 nm, too, and which comprise a relatively low specific thermal conductivity. The thermal insulation then may be adjusted by simply choosing an appropriate thickness of the barrier layer 122 without deteriorating the optical performance of the stack. $Al_2O_3$ is also an appropriate material for the barrier layer 122. Furthermore the barrier layer may be a multi layer structure. Consequently, the $I_2$ layer thickness can be as thin as necessary for optimum optical and thermal performance.

It is noted that the present invention is not restricted to the above preferred embodiments. Other recording layer materials, dielectric layer materials, thermal barrier layer materials, reflection layer materials, substrate materials and/or cover layer materials may be applied. Furthermore, the invention is not restricted to optical record carriers having a single recording layer configuration as described herein above. A multiple recording layer configuration comprising two or more than two recording layers with the optical properties according to the present invention may be provided. Thereby, two or more recording stacks as described herein above may be provided both or only one of which comprising a barrier layer.

The invention claimed is:

1. A rewritable optical record carrier consisting of a recording stack of layers in the following order:
    a first dielectric layer having a thickness at a first amorphous reflection minimum;
    a recording layer comprising a phase-change recording material;
    a second dielectric layer; and
    a mirror layer deposited onto the second dielectric layer side of the recording stack,
    a single thermal barrier layer arranged adjacent to said first dielectric layer opposite the mirror layer to reduce heat dissipation eminating from the recording layer and passing through the first dielectric layer thus allowing the thickness of the first dielectric layer to be chosen at said first amorphous reflection minimum, and
    wherein said light entering the stack is applied to a side of said optical recording medium to which a substrate is closer than the recording layer, wherein said light entering the stack first penetrates the substrate, and passes through to a thermal barrier layer, the first and second dielectric layers and the recording layer,
    wherein the major component of the thermal barrier layer is different from the components or mixtures of the first dielectric layer materials.

2. The rewritable optical record carrier as claimed in claim 1, wherein the substrate carrying said stack of layers having said thermal barrier layer is arranged between said first dielectric layer and said substrate.

3. The rewritable optical record carrier as claimed in claim 2, wherein the refraction index of said thermal barrier layer is close to the refraction index of said substrate.

4. The rewritable optical record carrier as claimed in claim 1, wherein the rewritable optical record carrier further comprises a cover layer attached to said thermal barrier layer.

5. The rewritable optical record carrier as claimed in claim 4, wherein the refraction index of said thermal barrier layer is close to the refraction index of said cover layer.

6. The rewritable optical record carrier as claimed in claim 2, wherein said substrate material is polycarbonate or PMMA.

7. The rewritable optical record carrier as claimed in claim 4, wherein said cover layer material is polycarbonate or transparent polymer resin.

8. The rewritable optical record carrier as claimed in claim 1, wherein said thermal barrier layer material comprises $SiO_2$ or $Al_2O_3$ as a major component.

9. The rewritable optical record carrier as claimed in claim 1, wherein said first and second dielectric layer materials comprise one of the following components or a mixture thereof: $ZnS$, $SiO_2$, $Si_3N_4$, $Al_2O_3$ or $Ta_2O_5$.

10. The rewritable optical record carrier as claimed in claim 1, wherein said phase-change recording material comprises a mixture of Ge, In, Sb, and Te.

11. The rewritable optical record carrier as claimed in claim 1, wherein said first dielectric layer thickness dl can be represented as:

$$d_1 = (m^*\lambda)/(2^*n)$$

where m is an integer, $\lambda$ denotes the wavelength of the laser light, and n is the refractive index of the first dielectric layer material.

12. The rewritable optical record carrier as claimed in claim 11, wherein said amorphous and a crystalline reflection has minimum and maximum levels at certain $d_1$ values.

13. The rewritable optical record carrier as claimed in claim 12, wherein said amorphous reflection has a minimum level at a $d_1$ value when m=1.

* * * * *